US006956997B2

(12) United States Patent
Amleshi et al.

(10) Patent No.: US 6,956,997 B2
(45) Date of Patent: Oct. 18, 2005

(54) METHODS FOR FABRICATING AN ALIGNED OPTOELECTRONIC WAVEGUIDE CIRCUIT

(75) Inventors: Peerouz Amleshi, Lisle, IL (US); Masum Choudhury, Naperville, IL (US); Lawrence Kao, Naperville, IL (US); Gourgen Oganessyan, Downers Grove, IL (US)

(73) Assignee: Emcore Corporation, Somerset, NJ (US)

( * ) Notice: Subject to any disclaimer, the term of this patent is extended or adjusted under 35 U.S.C. 154(b) by 36 days.

(21) Appl. No.: 10/722,204

(22) Filed: Nov. 25, 2003

(65) Prior Publication Data

US 2005/0117846 A1 Jun. 2, 2005

Related U.S. Application Data

(60) Provisional application No. 60/429,337, filed on Nov. 25, 2002.

(51) Int. Cl.[7] .................................................. G02B 6/30

(52) U.S. Cl. ............................. 385/49; 385/14; 385/88; 385/131; 372/6; 372/50

(58) Field of Search .............................. 385/14, 49, 52, 385/88–94, 129–132; 372/6, 45, 46, 50

(56) References Cited

U.S. PATENT DOCUMENTS 4,286,838 A * 9/1981 Huignard et al. ............. 372/50
5,500,910 A 3/1996 Boudreau et al.
5,629,994 A 5/1997 Huber et al.
6,085,002 A 7/2000 Qiu et al.
6,148,124 A 11/2000 Aksyuk et al.
6,151,145 A 11/2000 Srivastava et al.
6,477,293 B1 11/2002 Golub
6,487,354 B1 * 11/2002 Ferm et al. ................. 385/129
6,507,685 B1 1/2003 Polynkin et al.

* cited by examiner

*Primary Examiner*—Phan T. H. Palmer
(74) *Attorney, Agent, or Firm*—Christie, Parker & Hale, LLP

(57) ABSTRACT

Two techniques are disclosed for writing waveguides between laser diodes and an optical fiber such that the laser diodes are aligned with their respective waveguide facets. The first technique utilizes a light sensitive polymer, such as a ultra-violet (UV) cross-linkable polymer. A precision writing system locates the light emitting centers of the laser diodes and writes the waveguide circuit by exposing the waveguiding regions with the appropriate light. The unexposed areas of the core layer are developed with a solvent and removed. The entire device is then encapsulated with a low-index cladding polymer. The second technique utilizes an active polymer approach in which waveguide regions are formed when the writing beam aligns the dipole molecules in the polymer to cause a change in the refractive index of the polymer.

16 Claims, 3 Drawing Sheets

METHODS FOR FABRICATING AN ALIGNED OPTOELECTRONIC WAVEGUIDE CIRCUIT

CROSS-REFERENCE TO RELATED APPLICATION

This patent application is a non-provisional patent application of prior U.S. provisional patent application Ser. No. 60/429,337, filed on Nov. 25, 2002, the right of priority of which is hereby claimed for this patent application.

FIELD OF THE INVENTION

The present invention relates generally to integrated optical circuits, and more particularly to methods of fabricating and aligning optoelectronic waveguide circuits.

BACKGROUND OF THE INVENTION

Optoelectronic waveguide circuits are used extensively in modern optical communication networks. Waveguide circuits are frequently used in the implementation of optical interconnects, optical switches, wavelength division (WDM) multiplexers and demultiplexers. For example, WDM multiplexers are known for their ability to increase the capacity of fiber optic links in a cost effective manner. WDM multiplexers also enable the data rate to be increased by combining several wavelength channels modulated at a relatively slow speed into a single optical fiber.

It is desirable to fabricate optoelectronic devices, such as transceivers, at low cost. An underlying problem with prior art optoelectronic devices is that integrating active components with waveguide circuits creates difficult manufacturing problems. For example, the emitting area of a laser diode needs to be accurately aligned with its waveguide facet in order to achieve good coupling efficiency of the laser source to the waveguide input. However, current manufacturing processes for actively aligning laser diodes with their corresponding waveguide facets are technically difficult, time consuming and costly. For example, placement of the laser diodes with respect to the waveguide facets may need to be accurate to within a few microns, or less. It is also difficult to place laser diodes, such as on a substrate, with such placement accuracies. There is therefore a need for more efficient and precise alignment techniques.

A general object of the present invention is to provide methods for more efficiently and more precisely aligning laser diodes with waveguide circuits.

Another object of the present invention is to write waveguide circuits to produce a circuit in which the waveguide inputs are accurately aligned with the emitting centers of the laser diodes.

A further object of the present invention is to utilize light sensitive polymer materials that can be written with a light beam to create waveguide circuits between the laser diodes and the optical fiber.

Yet another object of the present invention is to provide methods for accurately aligning laser diodes with a waveguide that eliminates need for the prior art active alignment techniques.

A still further object of the present invention is to utilize an active polymer layer that can be written with a light beam to create waveguide circuits between the laser diodes and the optical fiber.

SUMMARY OF THE INVENTION

Other objects, features and advantages of the invention will be apparent from the following detailed description taken in connection with the accompanying drawings.

This invention is directed to methods for fabricating a waveguide circuit to accurately align laser diodes with the waveguide circuit.

Two techniques are disclosed for writing waveguides between laser diodes and an optical fiber such that the laser diodes are aligned with their respective waveguide facets. The first technique utilizes a light sensitive polymer, such as a ultra-violet (UV) cross-linkable polymer. A cladding layer of a light-curable optical polymer is deposited on the substrate and cured. Laser diodes are then placed on the substrate. A higher index core polymer is then deposited on the substrate to encapsulate the buffer layer and the laser diodes. A precision writing system locates the light emitting centers of the laser diodes and writes the waveguide circuit by exposing the waveguiding regions with the appropriate light, such as UV. For example, S-shaped waveguides may be formed from the x-y coordinate of each laser diode to Y-branches and/or to an optical fiber. The unexposed areas of the core layer are developed with a solvent and removed. The entire device is then encapsulated with a low-index cladding polymer.

The second technique utilizes an active polymer approach. The electric field of the writing beam aligns the dipole molecules in the polymer to cause a change in the refractive index of the polymer. A buffer layer of low-index passive polymer is deposited on a suitable substrate. An active core layer with higher refractive index is then deposited on top of the buffer layer. A low-index cladding layer is deposited over the active core layer. A trench is etched into the polymer layers to a depth that aligns laser diodes placed in the trench with the middle core layer. The laser diodes are then placed in the trench. A precision writing system locates the emitting centers of the diodes and writes waveguides on the core polymer layer. If desired, the waveguide circuit may be encapsulated.

The present invention also relates to waveguide circuits made by such processes.

BRIEF DESCRIPTION OF THE DRAWINGS

The invention, together with its objects and the advantages thereof, may best be understood by reference to the following description taken in conjunction with the accompanying drawings, in which like reference numerals identify like elements in the figures, and in which.

DESCRIPTION OF THE PREFERRED EMBODIMENTS

It will be understood that the invention may be embodied in other specific forms without departing from the spirit thereof. The present examples and embodiments, therefore, are to be considered in all respects as illustrative and not restrictive, and the invention is not to be limited to the details given herein.

Figure 1:
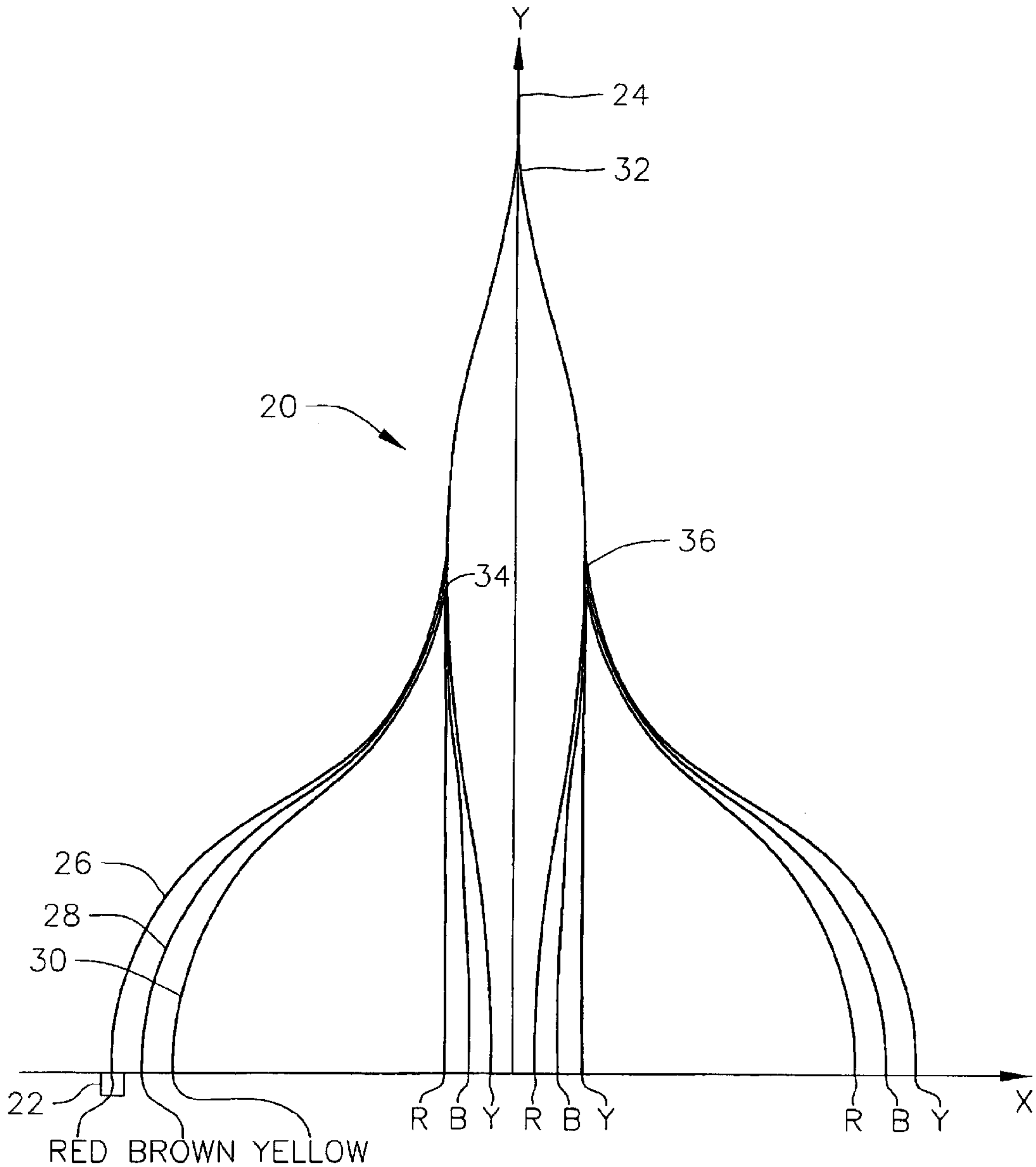
FIG. 1 is layout diagram illustrating multiple waveguide paths that may be written to align the light emitting centers of a plurality of laser diodes in a power combiner to an output optical fiber.

With reference to the drawing Figures, and particularly to FIG. 1, a waveguide circuit, generally designated 20, is made in accordance with the present invention. The x-y plane in FIG. 1 represents a material, such as a polymer that may be written by methods disclosed below, to form waveguide circuits between a plurality of laser diodes, such as laser diode 22, and an optical fiber 24.

A precision x-y stage equipped with a visual alignment system locates the light emitting center of each laser diode and uses a beam of collimated light to write the waveguide circuits, such as represented by the "Red" line 26 from laser diode 22. If laser diode 22 were placed to the right along the x-axis, such as at the "Brown" line 28 position, the precision x-y stage would then write line 28 instead of line 26. Similarly, if laser diode 22 is placed at, the "Yellow" line 30, line 30 will alternatively be written by the x-y stage. The x-y stage thus automatically determines the x-axis placement position of the laser diode 22 and writes a waveguide to laser diode 22. Thus, there is no need for any active alignment of the laser diode to the waveguide.

Note that the x-y stage can also compensate for any misalignment of laser diode 22 in the y-axis direction since the waveguide from laser diode 22 is in the y-axis direction such that lines 26–30 can easily be made longer or shorter to compensate for any misalignment of the diode along the x-axis in the y direction, such that each waveguide input starts at the light emitting center of the laser diode. Preferably, the optical fiber 24 and the three Y-branches 32, 34 and 36 are fixed. The x-y stage then need only generate a waveguide corresponding to one of lines 26–30 and a waveguide corresponding to each of the other RBY line sets, which essentially consist of S-shaped waveguide patterns to the respective Y-branch 34 or 36. Of course, these alignment techniques could also be expanded in another direction, such as along a z-axis, if so desired or needed.

Other laser diodes similar to laser diode 22 may be disposed at one of the Red-Brown-Yellow (RBY) lines in the three remaining RBY line sets. The embodiment illustrated in FIG. 1 thus combines signals from four laser diodes into a single optical fiber 24. The WDM waveguide circuit shown in FIG. 1 thus multiplexes optical signals from four laser diodes into a single optical fiber 24.

Various methods for writing waveguides may be used. In a first method, waveguides may be written by means of a collimated light beam on a polymer curable at the given wavelength. For example, a ultra-violet (UV) beam may be used to form waveguides on a JV cross-linkable polymer. The unexposed areas of the polymer are then developed in an appropriate solvent, as is typically done, for example, in photolithography.

Figure 2:
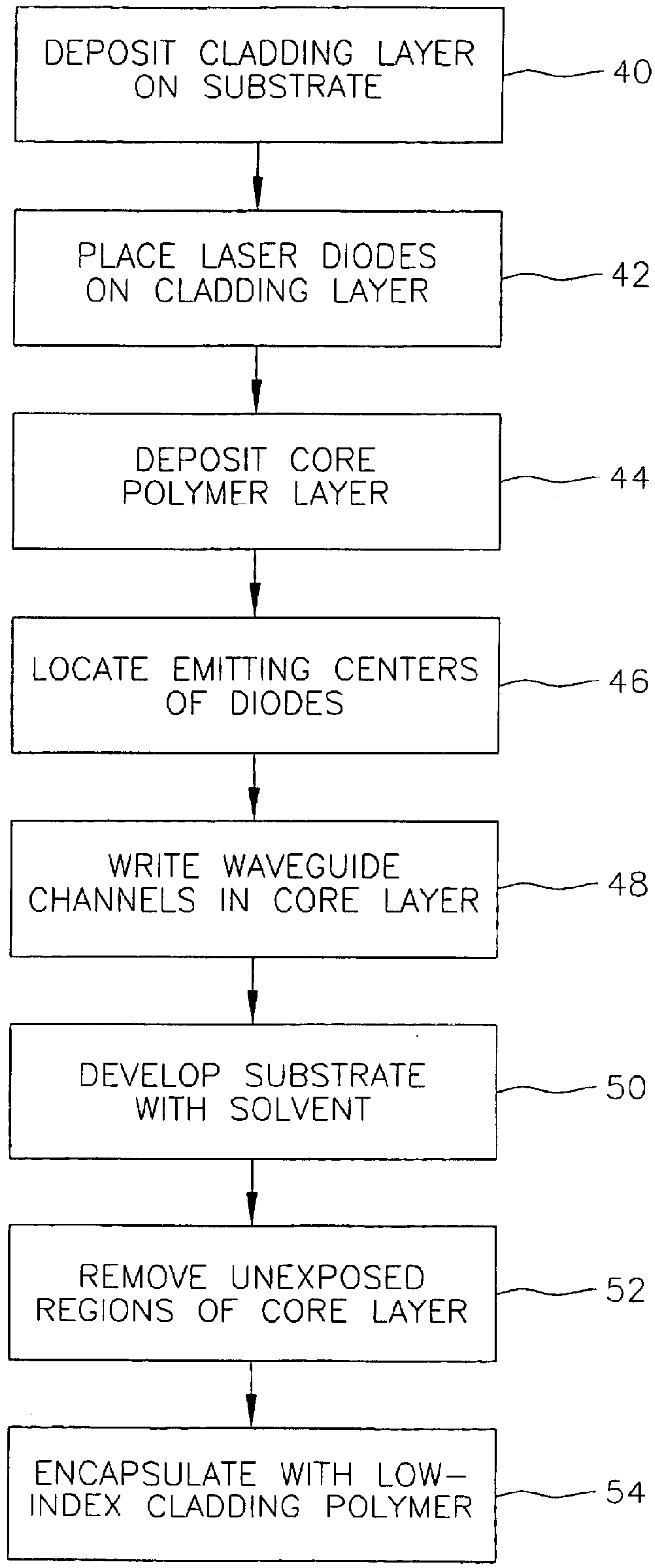
FIG. 2 is flow chart illustrating the various steps that may be utilized in writing waveguides on a light sensitive polymer to align the light emitting centers of laser diodes with the waveguides, in accordance with the present invention.

In this first method, a cladding layer of a light-curable optical polymer is deposited on a substrate and cured, as shown in block 40 of the process flowchart in FIG. 2. For example, this cladding layer may be any cross-linkable polymer, such as a mixture of Ebecryl 4883 and Ebecryl 680 manufactured by UCB Chemicals of Smyrna, Ga. Laser diodes are then precision placed and adhered to the cladding layer, as shown in block 42 of FIG. 2. A higher index core polymer is then deposited on the substrate, encapsulating the cladding layer and the laser diodes, as shown in block 44 of FIG. 2. This higher index core polymer may be Ebecryl 680. The precision writing system then locates the light emitting centers of the diodes, block 46, and writes the waveguiding regions in the core layer with a collimated light beam, block 48. The substrate is then developed in an appropriate solvent, block 50, and the unexposed regions of the core layer are removed, block 52. The entire device is then encapsulated in a low-index cladding polymer, such as Ebecryl 4883, as shown in block 54 of FIG. 2.

In accordance with a second method, waveguide patterns are written on a nonlinear optically active polymer with a laser beam. In this active polymer approach, the electric field of the writing beam aligns the dipole molecules of the polymer, which causes a change in the local refractive index of the polymer.

Figure 3:
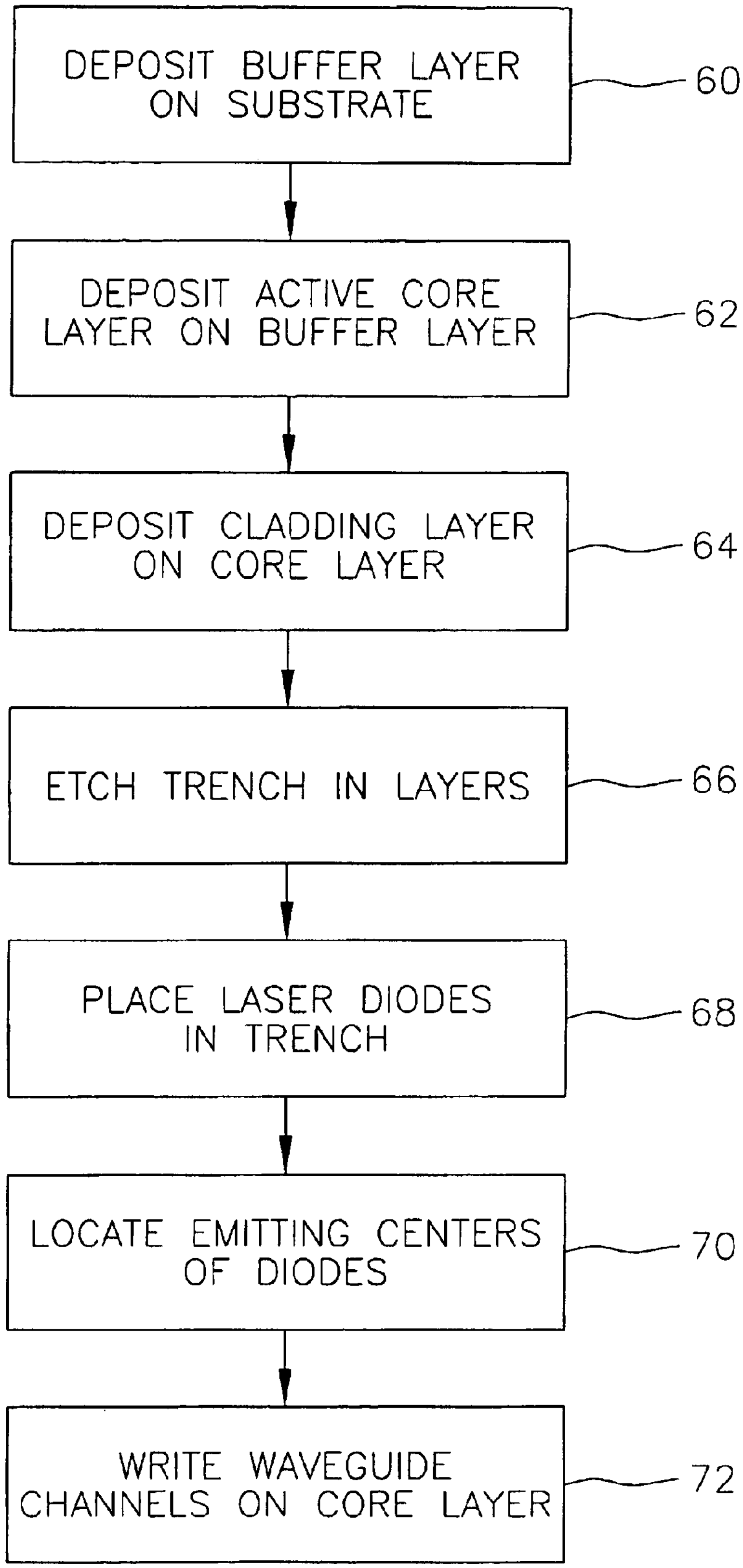
FIG. 3 is flow chart illustrating the various steps that may be utilized in writing waveguides on an active polymer to align the light emitting centers of laser diodes with the waveguides, also in accordance with the present invention.

More particularly, the active polymer method may be practiced with the following steps. A buffer layer of low-index passive polymer, such as Ebecryl 4883, is deposited on a suitable substrate by spin coating, as shown in block 60 of FIG. 3. An active core layer with higher refractive index, such as Ebecryl 680, is then deposited on top of the buffer layer; block 62. A low-index cladding layer, such as Ebecryl 4883, is deposited over the active core layer; block 64. Next, a trench is etched into the polymer layers via reactive ion etching with an oxygen plasma; block 66. The depth of the trench is such that laser diodes placed in the trench will have their light emitting regions aligned with the plane of the middle core layer. The laser diodes are then precision placed and attached inside the trench with an appropriate adhesive, as shown in block 68 of FIG. 3. A plurality of diodes may be placed in the trench by maintaining the desired spacing between them, or an array of diodes with predetermined spacings may be placed in the trench. The substrate is then placed on a precision x-y stage equipped with a visual alignment system, which locates the light emitting centers of the diodes, block 70, and writes input waveguides on the core polymer layer, block 72. When an array of laser diodes with predetermined spacing is used, it is necessary only to lace the light-emitting center of one of the diodes. Waveguide patterns for the remaining diodes in the array may then be written by moving the writing beam across the array by the predetermined diode spacings. The precision x-y stage may continue to write the input waveguides for the waveguide circuit, such as for a power combiner or for an arrayed waveguide grating device.

While particular embodiments of the invention have been shown and described, it will be obvious to those skilled in the art that changes and modifications may be made therein without departing from the invention in its broader aspects.

What is claimed is:

1. A method of coupling a laser diode to an optical fiber comprising:

placing the laser diode on a substrate;

depositing a polymer layer on at least a part of the substrate between the laser diode and the optical fiber;

locating a light emitting area of the laser diode; and forming a waveguide on the polymer layer between the light emitting area of the laser diode and the optical fiber.

2. The method of claim 1, wherein the polymer layer is light sensitive, and wherein forming the waveguide comprises writing a waveguide region on the polymer layer, developing the polymer layer with a solvent, and removing unexposed regions of the polymer layer.

3. The method of claim 2, further comprising encapsulating the waveguide with a low-index cladding polymer layer.

4. The method of claim 2, wherein writing the waveguide region comprises writing the waveguide region using a collimated light beam.

5. The method of claim 1, further comprising depositing a cladding layer of light-curable optical polymer on the substrate, wherein the laser diode is placed on the cladding layer.

6. The method of claim 5, wherein depositing the polymer layer comprises depositing the polymer layer on the cladding layer and the laser diode.

7. The method of claim 1, wherein the optical fiber is coupled to a plurality of waveguide branches, placing the laser diode comprises placing a plurality of laser diodes on the substrate, and forming the waveguide comprises forming a plurality of waveguides, each said waveguide being formed between one of the laser diodes and a corresponding one of the waveguide branches.

8. The method of claim 7, wherein the plurality of laser diodes comprises an array of laser diodes having predetermined spacings therebetween, wherein locating the light emitting area comprises locating the light emitting area of one of the laser diodes in the array.

9. The method of claim 1, further comprising encapsulating the waveguide with a low-index cladding polymer.

10. The method of claim 1, wherein the optical fiber is coupled to a plurality of waveguide branches, and forming the waveguide comprises forming the waveguide between the light emitting area of the laser diode and one of the waveguide branches.

11. The method of claim 1, wherein placing the laser diode comprises etching the polymer layer to form a trench, and placing the laser diode in the trench.

12. The method of claim 1, wherein the polymer layer comprises a nonlinear optically active polymer, and writing the waveguide comprises writing the waveguide using a laser beam so as to align dipole molecules of the polymer using an electric field of the laser beam, thereby causing a change in a local refractive index of the polymer.

13. The method of claim 1, further comprising depositing a buffer layer of low-index passive polymer on the substrate prior to depositing the polymer layer.

14. The method of claim 1, further comprising depositing a low-index cladding layer over the polymer layer.

15. A method of coupling a laser diode to an optical fiber comprising:

placing a cladding layer on a substrate;

placing the laser diode on the cladding layer;

depositing a polymer layer on the laser diode and the cladding layer;

locating a light emitting area of the laser diode; and forming a waveguide on the polymer layer between the light emitting area of the laser diode and the optical fiber.

16. A method of coupling a laser diode to an optical fiber comprising:

depositing a buffer layer on a substrate;

depositing a polymer layer on the buffer layer;

depositing a cladding layer on the polymer layer;

etching a trench into the layers to a depth such that the laser diode placed in the trench would be aligned with a plane of the polymer layer;

placing the laser diode in the trench;

locating a light emitting area of the laser diode; and forming a waveguide on the polymer layer between the light emitting area of the laser diode and the optical fiber.

* * * * *